United States Patent [19]

Nigol et al.

[11] 4,362,900

[45] Dec. 7, 1982

[54] AIR CYLINDER-TYPE VIBRATION ABSORBER FOR SUSPENDED CABLES AND SUSPENDED CABLE IN COMBINATION THEREWITH

[75] Inventors: Olaf Nigol, Etobicoke; Herbert J. Houston, Oakville, both of Canada

[73] Assignee: Slater Steel Industries Limited, Hamilton, Canada

[21] Appl. No.: 300,752

[22] Filed: Sep. 10, 1981

Related U.S. Application Data

[63] Continuation-in-part of Ser. No. 249,488, Mar. 31, 1981, abandoned.

[51] Int. Cl.³ .......................... H02G 7/14; H02G 7/12
[52] U.S. Cl. ............................................ 174/42; 174/146
[58] Field of Search ............................... 174/42, 146

[56] References Cited

U.S. PATENT DOCUMENTS 3,885,086  5/1975  Houston et al. ............... 174/42

Primary Examiner—Laramie E. Askin
Attorney, Agent, or Firm—Burgess, Ryan and Wayne

[57] ABSTRACT

A vibration absorber for attachment to suspended cables such as electrical transmission lines, to suppress vertical aeolian vibrations as well as horizontal sub-conductor oscillations. A clamp arm has one end attached to a suspended cable and a fulcrum adjacent the other end. The fulcrum is rotatably coupled to a frame, and the end of the clamp arm adjacent the fulcrum is coupled to the frame through the air cylinder damping element which forces air through a small orifice to provide viscous damping when the clamp arm is caused to rotate relative to the frame as a result of said vibrations or oscillations. A pair of torsion springs or non-rotatably mounted resilient washers acts to restore the initial orientation of the clamp arm.

11 Claims, 3 Drawing Figures

AIR CYLINDER-TYPE VIBRATION ABSORBER FOR SUSPENDED CABLES AND SUSPENDED CABLE IN COMBINATION THEREWITH

This application is a continuation-in-part of application Ser. No. 249,488, filed Mar. 31, 1981, now abandoned, and assigned to the assignee of the instant application.

BACKGROUND OF THE INVENTION

This application is directed to an improved vibration absorber for suspended cables including but not limited to electrical transmission lines; and more specifically to a device for absorbing energy to suppress mechanical subspan oscillation and aeolian vibration of such cables.

The vibration absorber herein described operates on the principles disclosed in co-pending U.S. patent application Ser. No. 147,096, filed May 7, 1980, assigned to the assignee of the present application and entitled "SUBSPAN OSCILLATION AND AEOLIAN VIBRATION ABSORBER FOR SINGLE AND BUNDLE CONDUCTORS". This prior application discloses and claims an essentially dissipative (as opposed to spring-type) vibration absorber, having a damping mechanical impedance which essentially matches the mechanical impedance of the transmission line to which the damper is attached. The acceptable range of damper impedance of the absorber is indicated as being anywhere between half and three times the transmission line mechanical impedance.

By essentially matching the transmission line mechanical impedance, and providing a dissipative (i.e., frequency independent) damping effect, the vibration absorber of the aforesaid U.S. patent application Ser. No. 147,096 provides optimum energy coupling between the transmission line and absorber, thus effectively absorbing travelling waves on the line before they build up to large amplitude standing waves which can cause damage to the line and associated supporting elements.

Until the aforesaid invention was made, prior art spring-type dampers had to be designed so that they operated effectively over the resonant frequency range of the transmission line to be damped. These dampers had to also be situated at points on the transmission line where standing waves would be of relatively large amplitude, i.e., at distances of a quarter wavelength from adjacent nodes.

The invention of U.S. patent application Ser. No. 147,096 relates to the use of vibration absorbers which can be connected to transmission lines to provide essentially dissipative damping. That is, these dampers utilize viscous-type effects, so that damping is essentially frequency independent. In contradistinction, those prior art dampers which utilized springs had undesirable resonance characteristics. A typical prior art vibration damper of this type is shown in U.S. Pat. No. 3,885,086. The vibration damper shown in this patent, however, is unsuitable for use in the arrangement contemplated by the aforementioned U.S. patent application Ser. No. 147,096, because it is incapable of providing the critical dissipative damping required. In U.S. Pat. No. 3,885,086, the annular washers 12 are situated between clamp arms 16 and adjacent frame portions 10, and secured thereto so that said washers do not rotate. The washers are of a resilient material, so that rotation of the clamp arm 16 results in deformation of the washers, the resilient characteristics of which then return the clamp arms to their initial orientations. In this arrangement, the only dissipative damping effects are provided by hysteresis losses within the resilient washers. Any attempt to increase the hysteresis losses by increasing the size of the washers, results in the spring force of the washers rising substantially faster than their hysteresis losses, making such a design impractical. Further, limitations of the resilient material itself make it impracticable to obtain sufficiently great hysteresis losses to provide critical dissipative damping. In addition, the hysteresis losses in the washers 12 are dependent upon both frequency and amplitude of vibration.

In contradistinction, dampers of U.S. patent application Ser. No. 147,096, being dissipative and therefore frequency-independent, need not be concerned with the resonant frequencies of the transmission line to which they are to be attached. Further, such dampers, being essentially impedance matched (i.e., within a range of half to three times the characteristic impedance of the transmission line to which they are to be attached), absorb travelling waves, so that they can be placed at any desired place on the transmission line to be damped.

Thus, there remains a need for an improved vibration absorber capable of being utilized according to the aforementioned principles.

Two types of improved vibration absorbers are described in U.S. patent application Ser. No. 216,870, filed on Dec. 16, 1980 (now abandoned in favor of continuation-in-part application Ser. No. 300,751 filed Sept. 10, 1981) and U.S. patent application Ser. No. 249,425, filed Mar. 31, 1981 (now abandoned in favor of continuation-in-part application Ser. No. 300,926, filed Sept. 10, 1981), all of said applications being assigned to the assignee of the instant application.

Accordingly, an object of the present invention is to provide an improved vibration absorber in which the damping effect produced is essentially dissipative and therefore frequency-independent, and wherein the damping impedance is adjustable to a value capable of essentially matching the mechanical characteristic impedance of the cable to which the vibration absorber is connected.

SUMMARY

As herein described, there is provided an air-cylinder type vibration absorber for suspended cables, comprising a frame; a clamp body having a first portion for engaging a cable in a predetermined position and a second portion including (i) a fulcrum part rotatably mounted to said frame for rotation of said clamp body about an axis generally parallel to said predetermined position of said cable, and (ii) a damping means engaging part adjacent said fulcrum part; orifice means; an air cylinder coupled between said damping means engaging part of said clamp body and said frame for forcing air through said orifice means to produce viscous frictional losses in response to rotational movement of said clamp body about said axis; resilient means coupled to said frame for restoring said clamp arm to an initial angular orientation thereof with respect to said frame; and means for adjusting said orifice means so that said viscous frictional losses provide essentially dissipative damping for both said cable and said resilient means.

IN THE DRAWINGS

DETAILED DESCRIPTION

Figures 1, 2:
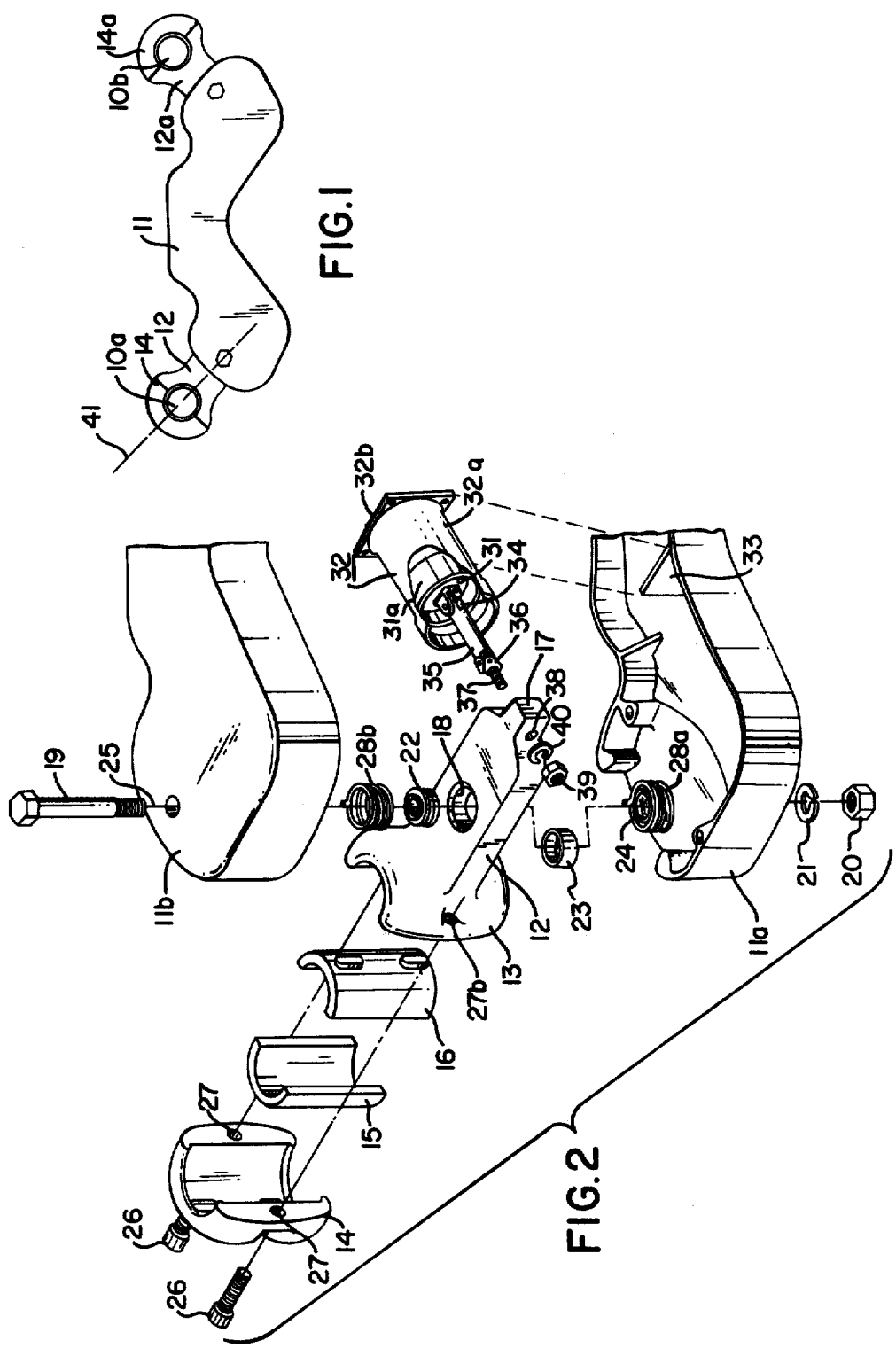
FIG. 1 is a front elevation view of an air cylinder-type vibration absorber according to a preferred embodiment of the invention.
FIG. 2 is an exploded perspective view of the left hand portion of said vibration absorber.

Aeolian vibration and sub-conductor oscillation derive their excitation from the minute forces associated with the release of vortices on the leeward side of conductors and cables when they are subjected to a steady air flow across their surfaces. It is believed that the excitation of aeolian vibration is derived from the detachment of the vortices and that sub-conductor oscillation is derived from the flow of the released vortices past the leeward conductor.

This release of vortices produces travelling waves which proceed along the span in opposite directions from their origin toward the suspension points. These waves in turn release other vortices to reinforce and amplify the wave motion. When the travelling wave arrives at the suspension point of the conductor, that is the attachment point of the conductor to the supporting structure, it is reflected with a 180° phase reversal due to the rigidity of the support point. The damping characteristics of the conductor and the suspension hardware are very small, so that attenuation of the travelling waves is also very small. This allows the travelling wave to make a large number of passes in a given span to thereby generate a standing wave having an amplitude of constant value, the amplitude being determined by the total damping of the system.

The aforementioned vibration phenomena may be avoided by preventing the formation of a standing wave rather than attempting to control the amplitude of the standing wave. Since it is not feasible to prevent vortex detachment, the present invention provides an absorber which will absorb the travelling wave and prevent its reflection back along the conductor. This is achieved by matching the dissipative impedance of the absorber with the characteristic mechanical impedance of the conductor.

The characteristic mechanical impedance of a conductor is defined as the ratio of force and velocity amplitudes of the travelling waves. Since the mechanical impedance of the conductor is a function of the tension in the conductor and the mass of the conductor per unit length, an absorber can be designed to match the mechanical impedance of the conductor for any given installation. Further, because the use of a dissipative damper for absorbing the wave does not require a frequency dependent resilient system, the absorber may be placed at any convenient location along the span of the conductor and not, as previously described, just at $\lambda/4$ wavepoints of the center aeolian frequency of the conductor.

Under ideal conditions where the absorber is installed at any point on the conductor, the absorber impedance R should be $k\sqrt{Tm}$, where T is the tension of the conductor, m is the mass of the conductor per unit length, and k is a damping parameter which, under the aforementioned ideal conditions, equals 2.0 to reflect the fact that the conductor extends in both directions from the absorber. It has been found that significant improvements in vibration control may be achieved by selecting an absorber impedance or damping factor in the range of $0.5\sqrt{Tm}$ to $3\sqrt{Tm}$. Thus, increases in T and m due to icing of the conductors will not unduly affect the operation of the absorber.

This principle may be applied to sub-conductor oscillation by utilizing the inertial mass of other bundle conductors to provide support for the damping member. Thus, by arranging a rotary action type vibration absorber at an angle of 45° or at least in the range of 30° to 60° from the vertical and horizontal planes, it will absorb the travelling waves associated with the build-up of both vertical aeolian vibration and horizontal subconductor oscillation.

A spacer damper type vibration absorber which operates in the aforementioned manner, viz., by interconnection between two adjacent cables or bundle conductors 10a and 10b, is illustrated in FIG. 1 of the drawing. This spacer damper comprises a frame 11 having two opposed spaced-apart portions 11a and 11b.

A clamp arm 12 has an end portion 13 for engaging the cable 10a, via clamp keeper 14 and elastomeric inserts 15 and 16. Another clamp arm 12a at the opposite end of the frame 11 similarly has an end portion for engaging cable 10b.

To avoid confusion, further discussion will be confined to only one end of the frame 11 and its associated clamp arm 12.

Adjacent the end 17 of the clamp arm 12 remote from the cable 10a is a fulcrum 18 which is rotatably mounted to the frame 11 by means of a bolt 19, secured in position by a nut 20 and a lock washer 21.

Rotational friction and wear are minimized by spherical bearing 22 disposed within sleeve 23 which abuts frame boss 24.

The end portion 13 of the clamp arm 12 has a longitudinal groove for receiving the cable 10a in a predetermined orientation generally parallel to the rotational axis 25 of the clamp arm 12 as defined by the longitudinal axis of the bolt 19. The clamp keeper 14 cooperates with the clamp arm 12 (via inserts 15 and 16) to retain the cable 10a in position, the clamp keeper 14 being urged toward the clamp arm 12 by means of bolts 26 through holes 27 and threaded holes 27b in the end 13 of the clamp body 12.

Rotation of the clamp arm 12 with respect to the frame 11 may be resisted if necessary, by the torsion spring 28a, which surrounds the frame boss 24, and has one end secured to the frame portion 11a and the other end secured to the clamp arm 12; and by the torsion spring 28b, which surrounds a boss (not shown) of the frame portion 11b and has one end secured to said boss and the other end secured to the clamp arm 12, which springs act to restore the clamp arm 12 to its initial or "neutral" position with respect to the frame 11 after the clamp arm 12 has been deflected by aeolian vibration or subconductor oscillation forces.

An air cylinder or pneumatic damper 32 of conventional construction has a cylindrical body portion 32a, a mounting flange 32b secured to the inner wall section 33 of the frame portion 11a, a universal joint 34 secured to the piston thereof, a coupling shaft 35, another universal joint 36 (the shaft 35 extending between said universal joints) and a threaded stud 37 extending from the universal joint 36. The stud 37 extends through a hole 38 in the clamp arm end 17, and is secured thereto by the nut 39 and lockwasher 40.

Dissipative energy losses occur primarily as a result of viscous friction resulting from the forcing of air through the controlled orifice 31 in the piston 31a of the air cylinder 32 by reciprocating movement of the piston thereof resulting from movement of the clamp body end part 17 toward and away from the frame walls, as a result of rotation of the clamp body 12 about the axis 25. Losses due to hysteresis in the air cylinder 32 and springs 28a and 28b are relatively small in comparison with the viscous frictional losses.

The amount of frictional force or loss, i.e., the dissipative damping factor of the spacer damper, may be adjusted by varying the size of the orifice 31, e.g., by drilling the same out or by substituting various inserts of different orifice size therefor. In the latter case, orifices are preferably provided as predrilled threaded inserts.

By appropriately selecting the orifice size, dissipative damping factors in the aforementioned desired range of $0.5\sqrt{Tm}$ to $3.0\sqrt{Tm}$ can be obtained.

As best seen in FIG. 1, for equal response to vertical aeolian vibrations and horizontal sub-conductor oscillations, the spacer-damper should be constructed and positioned such that a line 41 normal to and intersecting the axis of rotation of the clamp arm 12 about the frame 11 and the cable 10a, makes an angle of 45°, with respect to the horizontal. For a particular application where enhanced response to either vertical or horizontal movement of the cable 10a is desired, the aforementioned angle can be varied in the range of 30 to 60°.

With the aforementioned arrangement, the viscous friction produced by the air cylinder 32 via orifice 31 provides damping not only for the vibrations and oscillations of the cable 10a, but also for the torsion springs 28a and 28b.

The spacer damper described above may be installed on an electrical transmission line in an unequal spacing system, i.e., with the distance between adjacent spacer-damper units being different so that any two sub-adjacent spans would have a different response frequency to subconductor oscillation. The spacer-dampers act as gates under these conditions, dumping energy from the responding sub-span into the adjacent sub-spans. Because of the different response frequencies of the adjacent sub-spans, efficient energy absorption is thus attained.

In the alternative embodiment of the invention shown in FIG. 3, parts which are similar to those described with reference to FIG. 2 are given the same numerals preceded by the numeral 1.

Figure 3:
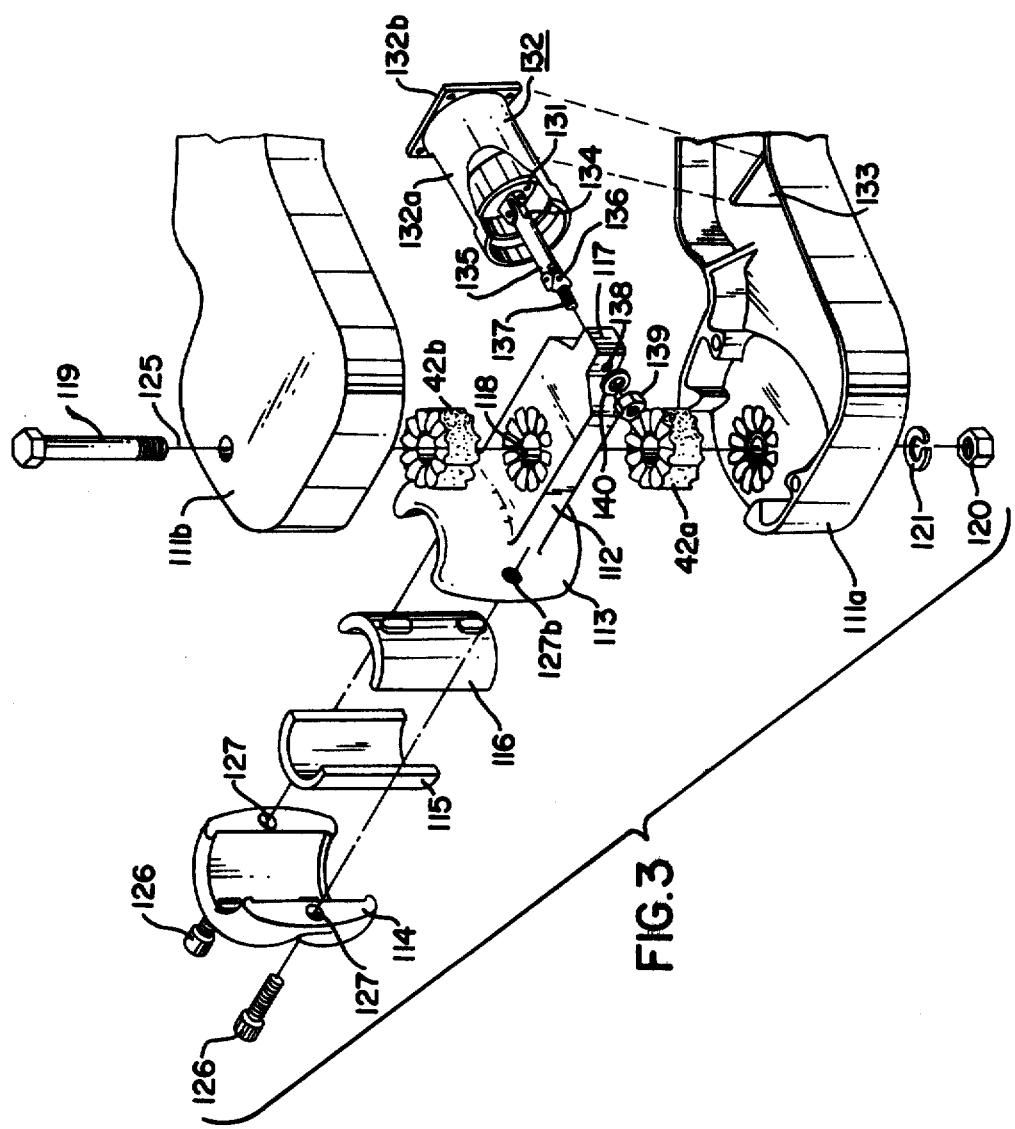
FIG. 3 is an exploded perspective view of the left hand portion of an air cylinder-type vibration absorber according to an alternative embodiment of the invention.

In the structure of FIG. 3, the clamp arm 112 is not freely rotatably mounted to frame portions 111a and 111b, but rather is mounted thereto by means of resilient washers 42a and 42b respectively, comprising a suitable material such as rubber. These resilient washers have undulating upper and lower surfaces, with the protuberances thereof engaging corresponding recesses in the adjacent frame and clamp arm members, to prevent rotation of the washers 42a and 42b with respect thereto.

The washers 42a and 42b are sufficiently thick and compliant to permit sufficient angular rotation between the clamp arm 112 and frame portions 111a and 111b, so that the corresponding deflection of the piston of the air cylinder 132 is sufficient to provide the desired damping effect. Any hysteresis losses within the resilient washers 42a and 42b are negligible compared to the viscous frictional losses within the air cylinder 132.

Since the resilient washers 42a and 42b provide the desired support of clamp arm 112, rotational compliance, and resilient action to restore the clamp arm 112 to its "neutral" position after the vibration of the cable secured to the clamp arm 112 has subsided, they replace the functions of the torsion springs 28a and 28b, bearing 22 and sleeve 23 utilized in the embodiment illustrated in FIG. 2.

What is claimed is:

1. An air cylinder-type vibration absorber for suspended cables, comprising:
   a frame having two opposed portions, at least one of said portions having an air cylinder support wall;
   a shaft extending between said portions;
   a clamp body having a first portion for engaging a cable in a predetermined position and a second portion including (i) a fulcrum part mounted to said shaft for rotation of said clamp body about an axis generally parallel to a predetermined position of a cable, and (ii) an end part adjacent said fulcrum part on the side thereof remote from said first portion;
   an air cylinder having an orifice and coupled between said end part of said clamp body and said wall for forcing air through said orifice to produce viscous frictional losses in response to rotational movement of said clamp body about said axis; and
   resilient means coaxial with said shaft for restoring said clamp body to an initial angular orientation thereof with respect to said frame,
   said orifice being adjustable to vary said viscous frictional losses, said losses substantially exceeding any hysteresis losses within said vibration absorber, so that said viscous frictional losses provide dissipative damping for both a cable and said resilient means.

2. The vibration absorber according to claim 1, wherein said resilient means comprises at least one torsion spring.

3. The vibration absorber according to claim 1, wherein said resilient means comprises at least one resilient washer mounted between said clamp body and frame.

4. The vibration absorber according to claim 1, wherein said air cylinder is coupled to said clamp body end part by means of at least one universal joint.

5. An air cylinder-type vibration absorber for suspended cables, comprising:
   a frame;
   a clamp body having a first portion for engaging a cable in a predetermined position and a second portion including (i) a fulcrum part rotatably mounted to said frame for rotation of said clamp body about an axis generally parallel to a predetermined position of a cable, and (ii) a damping means engaging part adjacent said fulcrum part;
   orifice means;
   an air cylinder coupled between said damping means engaging part of said clamp body and said frame for forcing air through said orifice means to produce viscous frictional losses in response to rotational movement of said clamp body about said axis;
   resilient means coupled to said frame for restoring said clamp body to an initial angular orientation thereof with respect to said frame; and
   means for varying said viscous frictional losses so that said viscous frictional losses provide essentially dissipative damping for both a cable and said resilient means.

6. An air cylinder-type vibration absorber according to claim 5, wherein said means for varying said losses comprises means for adjusting said orifice means.

7. An air cylinder-type vibration absorber for suspended cables, comprising:
- a frame having spaced frame elements;
- a shaft supported by said frame;
- a clamp body having a first portion for engaging a cable in a predetermined position and a second portion including (i) a fulcrum part rotatably mounted to said shaft for rotation of said clamp body about an axis generally parallel to a predetermined position of a cable, and (ii) a damping means engaging part adjacent said fulcrum part;
- orifice means;
- an air cylinder coupled between said damping means engaging part of said clamp body and at least one of said frame elements for forcing air through said orifice means to produce viscous frictional losses in response to rotational movement of said clamp body about said axis; and
- at least one resilient element coupled between said clamp body and said frame for restoring said clamp body to an initial angular orientation thereof with respect to said frame.

8. An cylinder-type vibration absorber according to claim 7, further comprising means for adjusting said orifice means to vary said viscous frictional losses, so that said viscous frictional losses provide dissipative damping for both a cable and said resilient element.

9. In combination,
- a suspended cable having a mechanical characteristic impedance given by $\sqrt{Tm}$, where T is the cable tension and m is the cable mass per unit length; and
- an air cylinder-type vibration absorber for said suspended cable, comprising:
- a frame;
- a clamp body having a first portion engaging said cable in a predetermined position and a second portion including (i) a fulcrum part rotatably mounted to said frame for rotation of said clamp body about an axis generally parallel to said predetermined position of said cable, and (ii) a damping means engaging part adjacent said fulcrum part;
- orifice means;
- an air cylinder coupled between said damping means engaging part of said clamp body and said frame for forcing air through said orifice means to produce viscous frictional losses in response to rotational movement of said clamp body about said axis;
- resilient means coupled to said frame for restoring said clamp body to an initial angular orientation thereof with respect to said frame; and
- means for adjusting said orifice means to vary said viscous frictional losses, said losses substantially exceeding any hysteresis losses within said vibration absorber, so that said viscous frictional losses provide dissipative damping for both said cable and said resilient means, with a damping factor equal to $k\sqrt{Tm}$, where $0.5 \leq k \leq 3$.

10. In combination,
- a suspended cable having a mechanical characteristic impedance given by $\sqrt{Tm}$, where T is the cable tension and m is the cable mass per unit length; and
- an air cylinder-type vibration absorber for said suspended cable, comprising:
- a frame having two opposed portions, at least one of said portions having an air cylinder support wall;
- a shaft extending between said portions;
- a clamp body having a first portion engaging said cable in a predetermined position and a second portion including (i) a fulcrum part mounted to said shaft for rotation of said clamp body about an axis generally parallel to said predetermined position of said cable, and (ii) an end part adjacent said fulcrum part on the side thereof remote from said first portion;
- an air cylinder having an orifice and coupled between said end part of said clamp body and said wall for forcing air through said orifice to produce viscous frictional losses in response to rotational movement of said clamp body about said axis;
- resilient means coaxial with said shaft for restoring said clamp body to an initial angular orientation thereof with respect to said frame; and
- means for adjusting said orifice means to vary said viscous frictional losses, so that said viscous frictional losses provide dissipative damping for both said cable and said resilient means, with a damping factor equal to $k\sqrt{Tm}$, where $0.5 \leq k \leq 3$.

11. In combination,
- a suspended cable having a mechanical characteristic impedance given by $\sqrt{Tm}$, where T is the cable tension and m is the cable mass per unit length; and
- an air cylinder-type vibration absorber for said suspended cable, comprising:
- a frame having spaced frame elements;
- a shaft supported by said frame;
- a clamp body having a first portion engaging said cable in a predetermined position and a second portion including (i) a fulcrum part rotatably mounted to said shaft for rotation of said clamp body about an axis generally parallel to said predetermined position of said cable, and (ii) a damping means engaging part adjacent said fulcrum part;
- orifice means;
- an air cylinder coupled between said damping means engaging part of said clamp body and at least one of said frame elements for forcing air through said orifice means to produce viscous frictional losses in response to rotational movement of said clamp body about said axis;
- at least one resilient element coupled between said clamp body and said frame for restoring said clamp body to an initial angular orientation thereof with respect to said frame; and
- means for adjusting said viscous frictional losses to provide dissipative damping for both said cable and resilient element, with a damping factor equal to $k\sqrt{Tm}$, where $0.5 \leq k \leq 3$.

* * * * *